United States Patent
Chou et al.

(10) Patent No.: US 8,806,252 B2
(45) Date of Patent: *Aug. 12, 2014

(54) SERVER CLUSTER AND CONTROL MECHANISM THEREOF

(75) Inventors: Le-Sheng Chou, Zhongli (TW); Sz-Chin Shih, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 149 days.

This patent is subject to a terminal disclaimer.

(21) Appl. No.: 13/449,655

(22) Filed: Apr. 18, 2012

(65) Prior Publication Data

US 2013/0086405 A1    Apr. 4, 2013

(30) Foreign Application Priority Data

Sep. 29, 2011  (TW) .............................. 100135347 A

(51) Int. Cl.
```
G06F 1/00       (2006.01)
G06F 11/00      (2006.01)
H04L 12/24      (2006.01)
H04L 12/26      (2006.01)
H04L 12/56      (2006.01)
```
(52) U.S. Cl.
CPC ............... G06F 11/00 (2013.01); H04L 12/24 (2013.01); H04L 12/26 (2013.01); *H04L 49/356* (2013.01)
USPC .......... 713/324; 713/300; 713/310; 713/320; 713/321; 713/322; 713/323; 713/330; 713/340

(58) Field of Classification Search
CPC ......... G06F 11/00; H04L 12/24; H04L 12/26; H04L 49/356

USPC ................. 713/300, 310, 320–324, 330, 340
See application file for complete search history.

(56) References Cited

U.S. PATENT DOCUMENTS

| | | | |
|---|---|---|---|
| 7,352,289 B1 * | 4/2008 | Harris ...................... | 340/870.07 |
| 7,472,179 B2 * | 12/2008 | Tarui et al. .................... | 709/223 |
| 7,573,832 B2 * | 8/2009 | Kenghe ......................... | 370/252 |
| 8,212,396 B2 * | 7/2012 | Chiou ............................ | 307/39 |
| 8,271,632 B2 * | 9/2012 | Kobayashi et al. ........... | 709/223 |
| 2008/0183880 A1 | 7/2008 | Sasage et al. | |
| 2011/0161695 A1 * | 6/2011 | Okita et al. .................... | 713/310 |

FOREIGN PATENT DOCUMENTS

TW    201013384 A    4/2010

OTHER PUBLICATIONS

Office Action issued by Taiwan Intellectual Property Office dated on Mar. 20, 2014.

* cited by examiner

*Primary Examiner* — M Elamin
(74) *Attorney, Agent, or Firm* — Rabin & Berdo, P.C.

(57) ABSTRACT

A server cluster including a network switch and multiple server nodes is provided. The network switch is connected to an external network. Each server node includes a network port, a network chip and a control unit. The network port is connected to the network switch via a cable. The network chip detects the cable to obtain a connection state with the external network at the server node after the network switch is started, and accordingly outputs a connection state signal. The control unit turns on or shuts down the server node according to the connection state signal and an on/off state of the server node.

3 Claims, 5 Drawing Sheets

SERVER CLUSTER AND CONTROL MECHANISM THEREOF

This application claims the benefit of Taiwan application Serial No. 100135347, filed Sep. 29, 2011, the subject matter of which is incorporated herein by reference.

BACKGROUND OF THE INVENTION

1. Field of the Invention

The invention relates in general to a server cluster and a control mechanism thereof.

2. Description of the Related Art

The blade server is optimized with modular design to reduce the physical space and energy to a minimum and further simplify the server configuration. However, when abnormal disconnection occurs to the network of the data center in which the blade server is located, the operation of the blade server relies on manual operation, or, the administrator can turn off the power of the blade server with a remote-end management server. However, the aforementioned mechanism cannot instantly respond to the disconnection state of the network, and is thus unable to save power for the blade server.

SUMMARY OF THE INVENTION

The invention is directed to a server cluster and a control mechanism thereof. A network connection state at the server node is detected, and the power of the server node is automatically turned on and shut down with a logic circuit, so that automatic control is achieved for saving power.

According to a first aspect of the present invention, a server cluster including a network switch and multiple server nodes is provided. The network switch is connected to an external network. Each server node includes a network port, a network chip and a control unit. The network port is connected to the network switch via a cable. The network chip detects the cable to obtain a connection state with the external network at the server node after the network switch is started, and accordingly outputs a connection state signal. The control unit turns on or shuts down the server node according to the connection state signal and an on/off state of the server node.

According to a second first aspect of the present invention, a control mechanism of a server cluster is provided. The server cluster includes a network switch and multiple server nodes. Each server node includes a network port, a network chip and a control unit. The network switch is connected to an external network. The network port is connected to the network switch via a cable. The control mechanism includes the following steps. A network switch is started. A network chip is used for detecting the cable to obtain a connection state with an external network at a server node and accordingly outputting a connection state signal. The control unit is used for turning on or shutting down the server node according to the connection state signal and an on/off state of the server node.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention provides a server cluster and a control mechanism thereof. A network connection state at the server node is detected, and the power of the server node is automatically turned on and shut down with a logic circuit, so that automatic control is achieved for saving power.

Figure 1A:
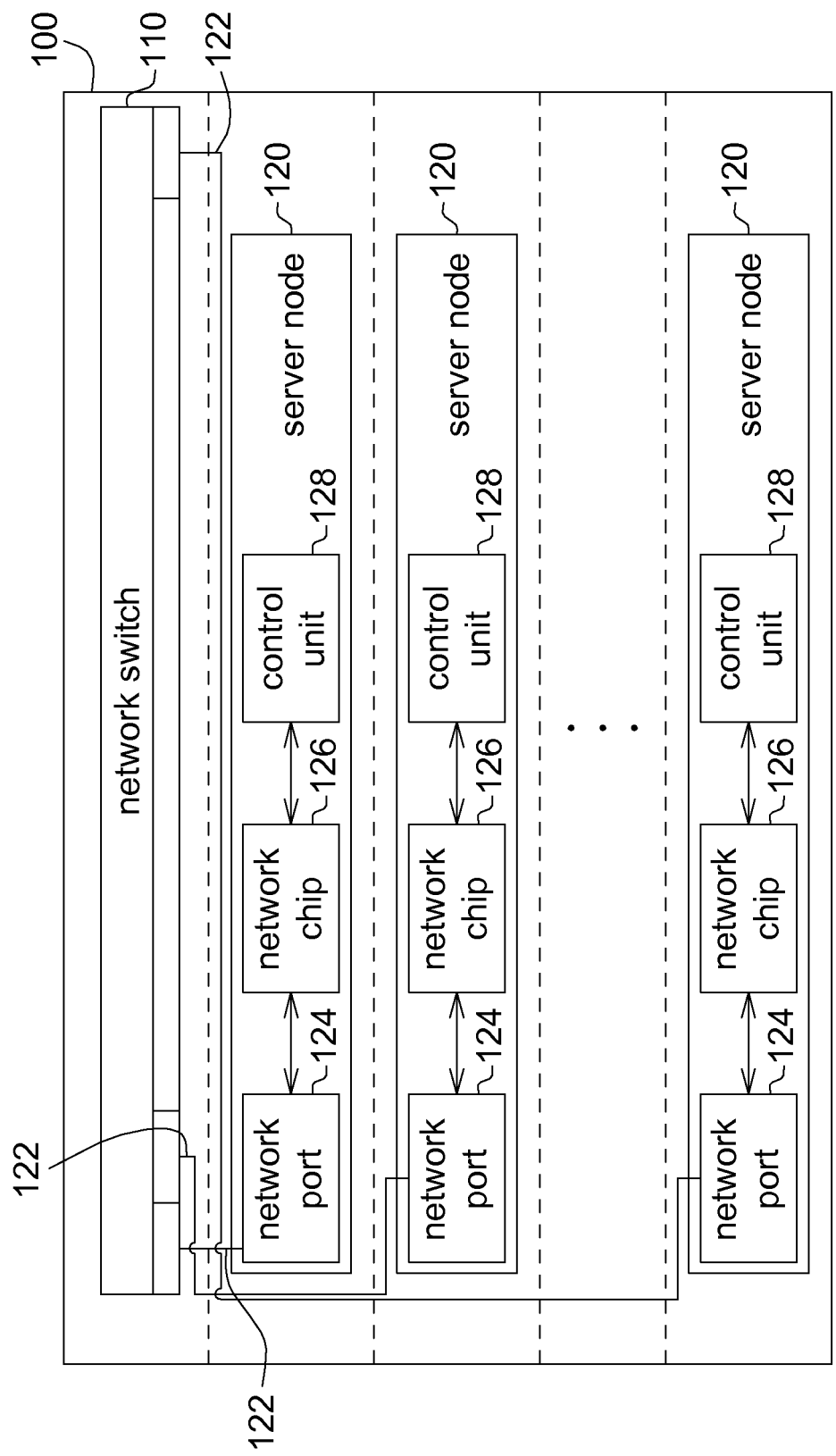
FIG. 1A shows a server cluster according to one embodiment of the invention.

Referring to FIG. 1A, a server cluster according to one embodiment of the invention is shown. The server cluster 100 includes a network switch 110 and multiple server nodes 120. The network switch 110 is connected to an external network such as an Internet. Each server node 120 includes a network port 124, a network chip 126 and a control unit 128. The network port 124 is connected to the network switch 110 via a cable 122. The network chip 126, through the cable 122, obtains a connection state with the external network at the server node 120 after the network switch 110 is turned on, and accordingly outputs a connection state signal LINK_LED_L. The control unit 128 turns on or shuts down the server node 120 according to the connection state signal LINK_LED_L and an on/off state of the server node 120.

Figure 1B:
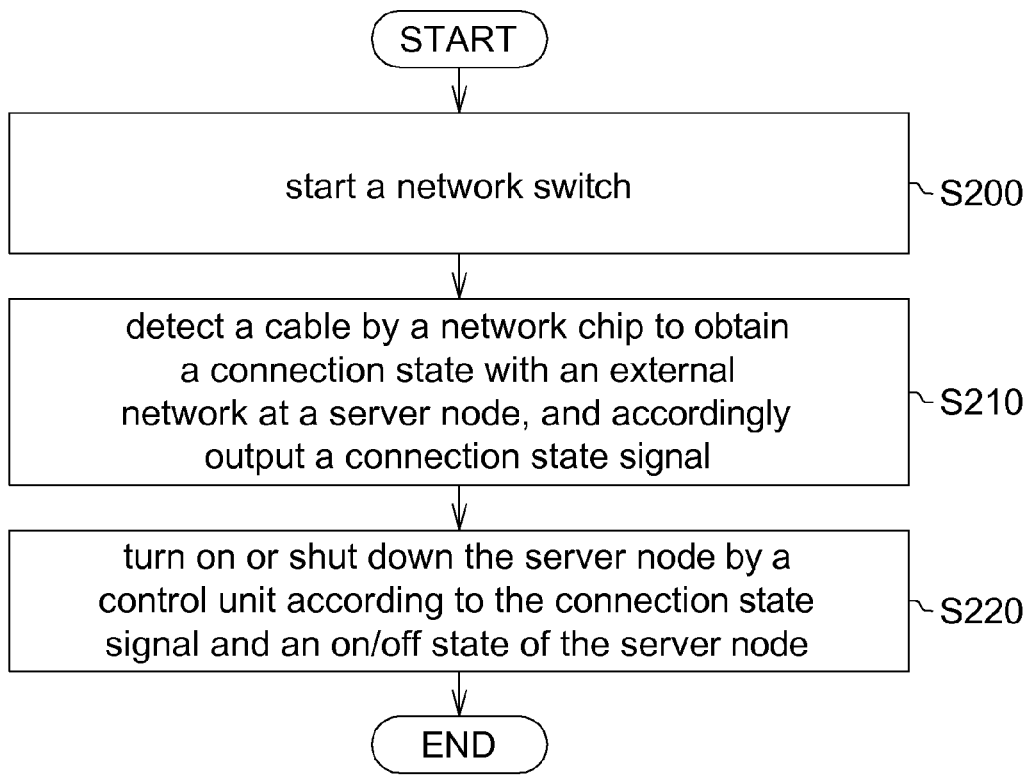
FIG. 1B shows a flowchart of a control mechanism of a server cluster according to one embodiment of the invention.

In response to the server cluster 100, the invention also provides a control mechanism of a server cluster. Referring to FIG. 1B, a flowchart of a control mechanism of a server cluster according to one embodiment of the invention is shown. In step S200, a network switch 110 is started. In step S210, a network chip 124, through a cable 122, obtains a connection state with an external network at a server node 120, and accordingly outputs a connection state signal LINK_LED_L. In step S220, a control unit 128 turns on or shuts down the server node 120 according to the connection state signal LINK_LED_L and an on/off state of the server node 120.

Figure 2A:
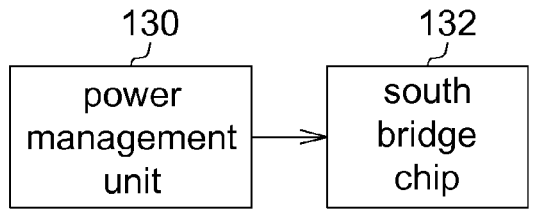
FIG. 2A shows a block diagram of a control unit according to one embodiment of the invention.

Referring to FIG. 2A, a block diagram of a control unit according to one embodiment of the invention is shown. The control unit 128 includes a power management unit 130 and a south bridge chip 132. The power management unit 130 is realized by such as a baseboard management controller (BMC) or a complex programmable logic device (CPLD). The power management unit 130 outputs a power signal PWR_BUT_L according to the connection state signal LINK_LED_L. The south bridge chip 132 turns on or shuts down the server node 120 according to the power signal PWR_BUT_L and an on/off state of the server node 120.

Figure 2B:
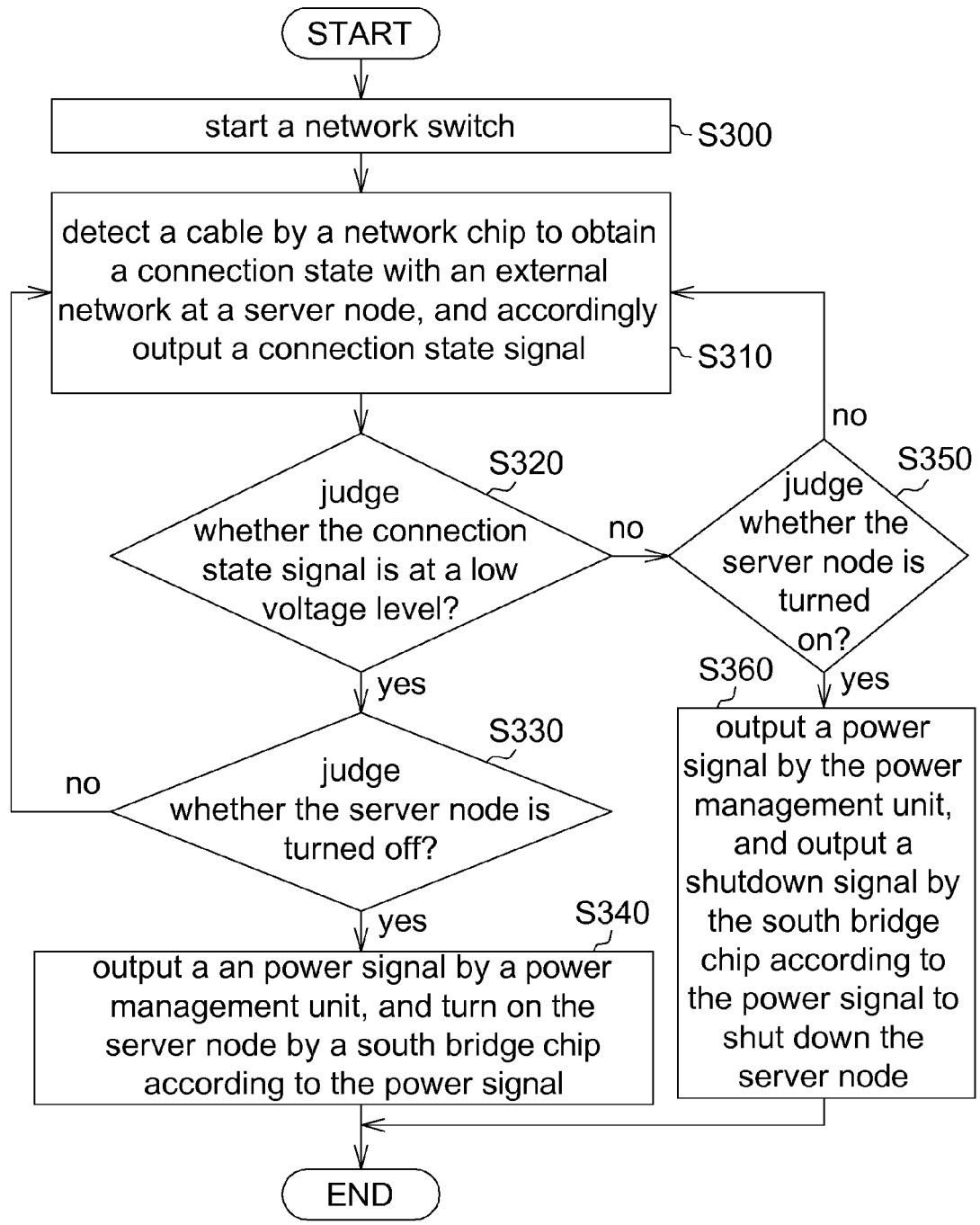
FIG. 2B shows a detailed flowchart of a control mechanism of a server cluster according to one embodiment of the invention.

Referring to FIG. 2B, a detailed flowchart of a control mechanism of a server cluster according to one embodiment of the invention is shown. In step S300, a network switch 110 is started. In step S310, after handshake protocols between the network chip 124 and the network switch 110, a network chip 124 detects a cable 122 connected to the network switch 110 to obtain a connection state with an external network at a server node 120, and accordingly outputs a connection state signal LINK_LED_L. For example, if the connection state signal LINK_LED_L is at a low voltage level, this indicates a connection state; if the connection state signal LINK_LED_L is at a high voltage level, this indicates a disconnection state.

In step S320, whether the connection state signal LINK_LED_L is at a low voltage level is judged. If the connection state signal LINK_LED_L is at a low voltage level, this indicates a connection state, then the process proceeds to step S330. In step S330, whether the server node 120 is turned off is judged. If the server node 120 is turned on, this indicates that the server node 120 is turned on and connected to the external network, then no further action is needed and the process returns to step S310. If the server node 120 is turned off, this indicates that the server node 120 is turned off but is connected to the external network, then the process proceeds to step S340. In step S340, a power management unit 130 outputs a an power signal PWR_BUT_L being, for example, at a low voltage level, and a south bridge chip 132 turns on the server node 120 according to the power signal PWR_BUT_L being at the low voltage level. In one embodiment, the power signal PWR_BUT_L could be set as high voltage level to direct the south bridge chip 132 to turn on the server node 120.

If the connection state signal LINK_LED_L is judged as being at a high voltage level in step S320, this indicates that the server node is not connected to the external network, then the process proceeds to step S350. In step S350, whether the server node 120 is turned on is judged. If the server node 120 is turned off, this indicates that the server node 120 is turned off and is disconnected from the external network, then no action is generated and the process returns to step S310. If the server node 120 is turned on, this indicates that the server node 120 is turned on but is disconnected from the external network, then the process proceeds to step S360. In step S360, the power management unit 130 outputs a power signal PWR_BUT_L being such as at a low voltage level, and the south bridge chip 132 outputs a shutdown signal according to the power signal PWR_BUT_L being at a low voltage level to shut down the server node 120. In one embodiment, the power signal PWR_BUT_L could be set as high voltage level to direct the south bridge chip 132 to shut down the server node 120.

Figure 3A:
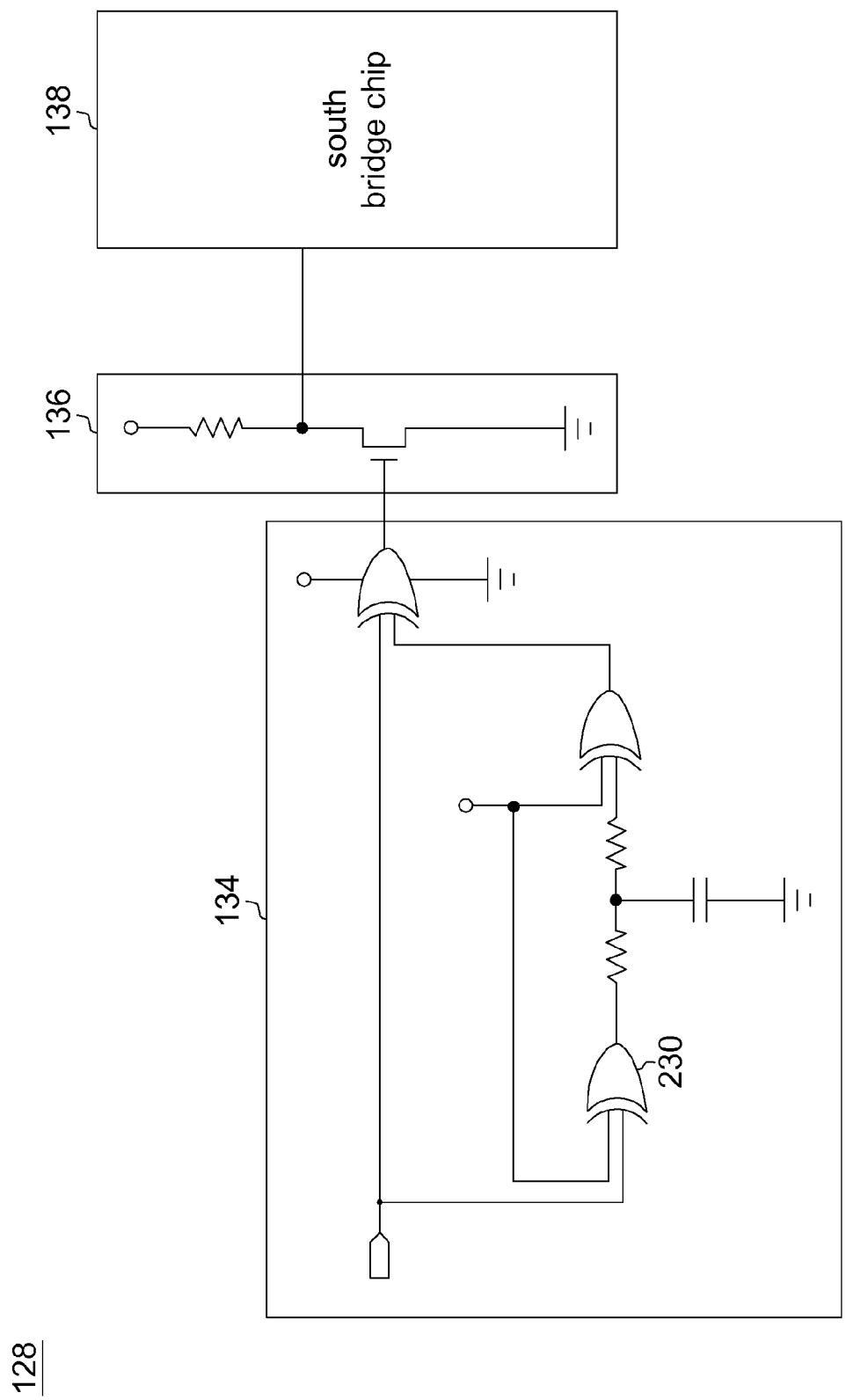
FIG. 3A shows a block diagram of a control unit according to another embodiment of the invention.

Referring to FIG. 3A, a block diagram of a control unit according to another embodiment of the invention is shown. The control unit 128 includes a dual edge detector 134, an inverter 136 and a south bridge chip 138. The dual edge detector 134 outputs a level signal when the voltage level of the connection state signal LINK_LED_L varies. The inverter 136 inverts a level signal into a power signal PWR_BUT_L. The south bridge chip 138 turns on or shuts down the server node 120 according to the power signal PWR_BUT_L and an on/off state of the server node 120. The inverter 136 is optionally used and the use of the inverter 136 is based on the enable signal received by the south bridge chip 138. In other words, if the signal LINK_LED_L outputted from the dual edge detector 134 can be received and understood by the south bridge chip 138 for directly turning on or shutting down the server node 120, then the inverter 136 can be omitted.

Figure 3B:
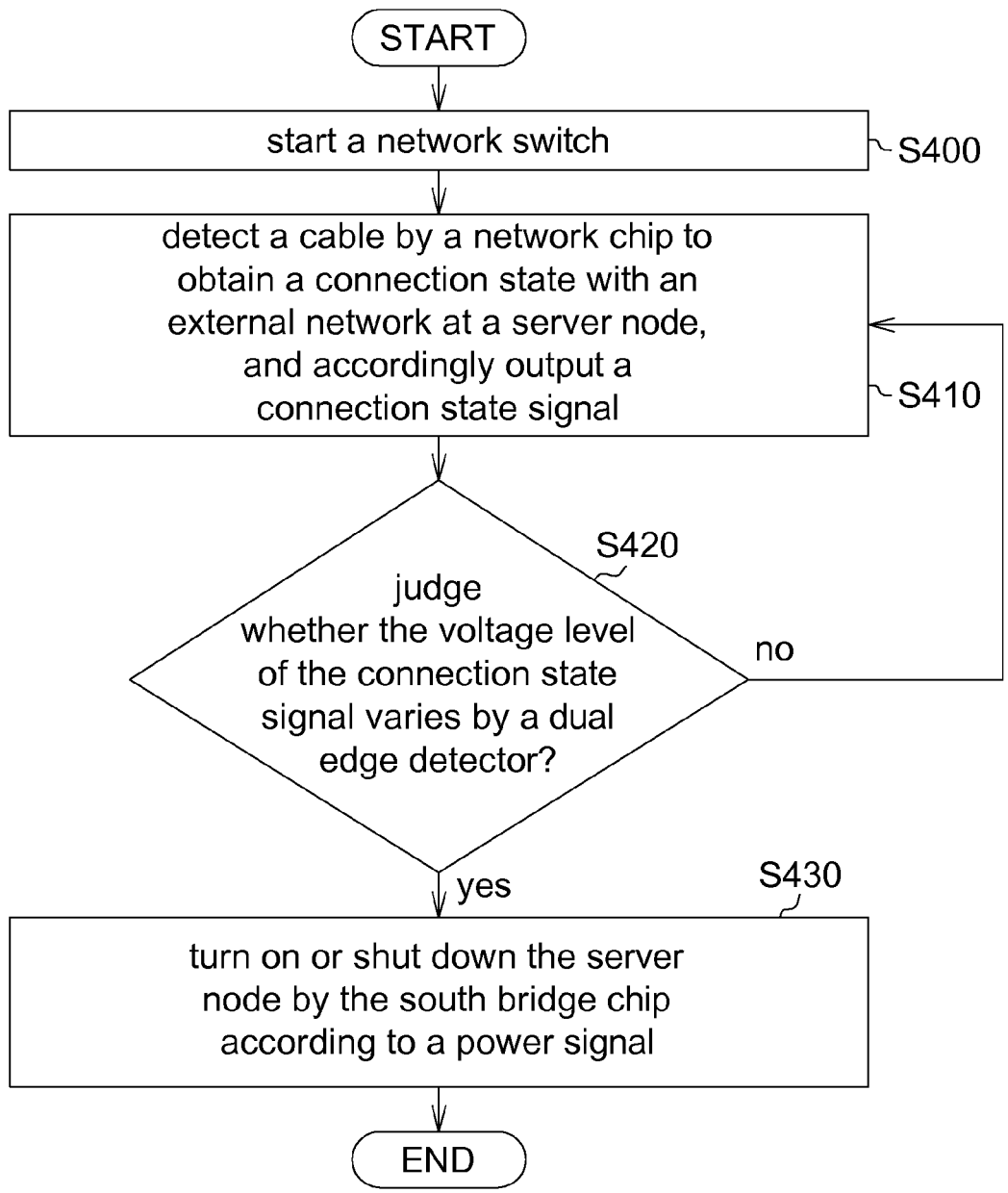
FIG. 3B shows a detailed flowchart of a control mechanism of a server cluster according to another embodiment of the invention.

Referring to FIG. 3B, a detailed flowchart of a control mechanism of a server cluster according to another embodiment of the invention is shown. In step S400, a network switch 110 is started. In step S410, after handshake protocols between the network chip 124 and the network switch 110, a network chip 124 detects a cable 122 connected to a network switch 110 to obtain a connection state with an external network at a server node 120, and accordingly outputs a connection state signal LINK_LED_L. For example, if the connection state signal LINK_LED_L is at a low voltage level, this indicates a connection state; if the connection state signal LINK_LED_L is at a high voltage level, this indicates a disconnection state.

In step S420, whether the voltage level of the connection state signal LINK_LED_L varies is judged by a dual edge detector 134. If no variation occurs, then the process returns to step S410. If the voltage level of the connection state signal LINK_LED_L varies, then the power management unit 130 outputs a power signal PWR_BUT_L according to the connection state signal LINK_LED_L, and the process proceeds to step S430. In step S430, the south bridge chip 138 turns on or shuts down the server node 120 according to the power signal PWR_BUT_L. That is, when the server node 120 is turned off, the south bridge chip 138 turns on the server node 120 if the received power signal PWR_BUT_L is at a low voltage level; when the server node 120 is turned on, the south bridge chip 138 outputs a shutdown signal to shut down the server node 120 if the received power signal PWR_BUT_L is at a low voltage level. If the power signal PWR_BUT_L received by the south bridge chip 138 is at a high voltage level, then no action is generated.

According to the server cluster and the control mechanism thereof disclosed in the above embodiments of the invention, a network connection state at the server node is detected, and the power of the server node is automatically turned on and shut down with a simple logic circuit, so that automatic control is achieved for saving power without using any manual operation or remote-end management server.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A server cluster, comprising:
a network switch connected to an external network; and
a plurality of server nodes, each comprising:
  a network port connected to the network switch via a cable;
  a network chip used for detecting the cable to obtain a connection state with the external network at the server node after the network switch is started and accordingly outputting a connection state signal; and
  a control unit used for turning on or shutting down the server node according to the connection state signal and an on/off state of the server node, including
  a dual edge detector used for outputting a level signal when the voltage level of the connection state signal varies,
  a south bridge chip used for turning on or shutting down the server node according to the level signal and an on/off state of the server node, and
  an inverter used for inverting the level signal into a power signal and further transmitting the power signal to the south bridge chip, such that the south bridge chip turns on or shuts down the server node according to the power signal and an on/off state of the server node,
  wherein, when the server node is turned off, the south bridge chip turns on the server node according to the power signal, and when the server node is turned on, the south bridge chip outputs a shutdown signal to shut down the server node according to the power signal.

2. A server cluster, comprising:

a network switch connected to an external network; and a plurality of server nodes, each comprising:

- a network port connected to the network switch via a cable;
- a network chip used for detecting the cable to obtain a connection state with the external network at the server node after the network switch is started and accordingly outputting a connection state signal; and
- a control unit used for turning on or shutting down the server node according to the connection state signal and an on/off state of the server node, comprising:
  - a power management unit used for outputting a power signal according to the connection state signal; and
  - a south bridge chip used for turning on or shutting down the server node according to the power signal and an on/off state of the server node;

wherein, when the connection state signal corresponds to a connection state and the server node is turned off, the south bridge chip turns on the server node according to the power signal; when the connection state signal corresponds to a disconnection state and the server node is turned on, the south bridge chip outputs a shutdown signal to shut down the server node according to the power signal.

3. A control mechanism of a server cluster, wherein the server cluster comprises a network switch and a plurality of server nodes, each server node comprises a network port, a network chip and a control unit, the network switch is connected to an external network, the network port is connected to the network switch via a cable, and the control mechanism comprises:

starting the network switch;

detecting the cable by the network chip to obtain a connection state with the external network at the server node, and accordingly outputting a connection state signal;

turning on or shutting down the server node by the control unit according to the connection state signal and an on/off state of the server node;

outputting a power signal by a power management unit of the control unit according to the connection state signal;

turning on or shutting down the server node by a south bridge chip of the control unit according to the power signal and an on/off state of the server node;

turning on the server node by the south bridge chip according to the power signal when the connection state signal corresponds to a connection state and the server node is turned off; and outputting a shutdown signal by the south bridge chip to shut down the server node according to the power signal when the connection state signal corresponds to a disconnection state and the server node is turned on.

\* \* \* \* \*